United States Patent Office 3,511,871
Patented May 12, 1970

3,511,871
GLYCYRRHETINIC ACID DERIVATIVES
John Cameron Turner, West Wickham, England, assignor to Biorex Laboratories Limited, London, England
No Drawing. Filed Sept. 20, 1967, Ser. No. 669,273
Claims priority, application Great Britain, Sept. 20, 1966, 42,008/66
Int. Cl. C07c *171/04, 79/44*
U.S. Cl. 260—468　　　　　　　　　　　　　　6 Claims

ABSTRACT OF THE DISCLOSURE

New derivatives of glycyrrhetinic acid obtained by the action of nitric acid on glycyrrhetinic acid, optionally followed by reaction with bases. The new compounds are intermediates in the preparation of pharmaceuticals.

BACKGROUND OF INVENTION

It is known that glycyrrhetinic acid and many of its derivatives exhibit valuable therapeutic properties and, in particular, possess an anti-inflammatory activity. However, there is an obvious need, to improve and/or modify the utility of glycyrrhetinic acid derivatives, for example, by potentiating existant activity or by modifying and altering the activity or by reducing undesirable properties, such as toxicity.

The best ways to effect the activity of a pharmaceutically-active compound are either to modify the molecule or to add, remove or replace substituents in the molecule.

SUMMARY OF THE INVENTION

It is an object of the present invention to provide new derivatives of glycyrrhetinic acid which are valuable intermediates for the preparation of pharmaceuticals.

The new derivatives of glycyrrhetinic acid according to the present invention are compounds of the general formulae:

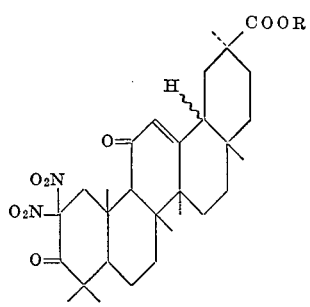

(I)

and

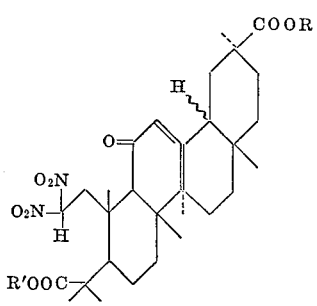

(II)

wherein R and R', which may be the same or different, are hydrogen atoms or substituted or unsubstituted, saturated or unsaturated, straight-chain or branched hydrocarbon radicals.

DETAILED DESCRIPTION OF THE INVENTION

The substituents R and R' are preferably alkyl, alkenyl or alkynyl radicals containing up to 6 carbon atoms, which may be substituted by, for example, halogen atoms, preferably chlorine or bromine atoms. As examples of such radicals, there may be mentioned methyl, ethyl, isopropyl, n-butyl, n-hexyl, bromomethyl, 2-chloroethyl-3-chloro-n-propyl, 6-chloro-n-hexyl, allyl, vinyl and propynyl radicals.

In order to prepare the compounds of general Formula I in which R is a hydrogen atom, glycrrhetinic acid or 3-keto-glycyrrhetinic acid is reacted with nitric acid. The reaction can, if desired, be carried out in an appropriate inert diluent, such as acetic acid or dioxan.

When it is desired to obtain the esters of general Formula I, the corresponding esters of glycyrrhetinic acid or of 3-keto-glycyrrhetinic acid are used as starting materials or the free acid of general Formula I is esterified in known manner, for example, by reaction with an appropriate diazo compound.

The compounds of general Formula I are stable to acids but are sensitive to bases. Thus, when a compound of general Formula I is reacted with an aqueous solution of sodium hydroxide, preferably at an elevated temperature, there is obtained a compound of general Formula II in which R' is a hydrogen atom. If desired, the —COOR' group (R'=H) can be esterified by reaction with an appropriate diazo compound. When R is also a hydrogen atom, then the —COOR group (R=H) is esterified at the same time.

When a compound of general Formula I is reacted, preferably at room temperature, with sodium carbonate in an aqueous solution of an appropriate alcohol, then there is obtained a compound of general Formula II, in which the —COOR' group is esterified by the alcohol used and when it is reacted with an appropriate alkali metal alkoxide in alcoholic solution, then there is obtained a compound of general Formula II in which R' in the —COOR' group corresponds to the alkyl radical in the alkoxide used. When R in the starting material (I) is a hydrogen atom, the product (II) obtained therefrom can then, if desired, be esterified at the —COOR (R=H) group with an appropriate diazo compound.

An advantage of using sodium carbonate for the reaction with compounds of general Formula I is that it is thus possible to produce mixed esters of general Formula II.

The new compounds of general Formulae I and II are valuable intermediates for the preparation of pharmaceutically-active compounds.

The following examples are given for the purpose of illustrating the present invention:

EXAMPLE 1

100 g. 18β-glycyrrhetinic acid were mixed with 100 cc. acetic acid and 100 cc. concentrated nitric acid. The temperature rose spontaneously to the boiling point (about 90° C.) and the violent reaction was completed in about 5 minutes. 200 ml. alcohol were added cautiously to the hot reaction mixture to remove excess nitric acid and the insoluble material was filtered off, washed with alcohol and dried to give 83 g. almost pure 2,2-dinitro-3,11-dioxo-18β-olean-12-en-30-oic acid (1) (R=H), with a melting point of 246–248° C. (decomp.), in the form of pale yellow crystals. Recrystallisation from aqueous acetone or aqueous dimethyl formamide gave a white material of the same melting point; $[\alpha]_D = +162 = 1°$ (C.=1% in acetone).

*Analysis.*—$C_{30}H_{42}N_2O_8$ (M.W. 558) calc. (percent): C, 64.5; H, 7.6; N, 5.0. Found (percent): C, 65.0; H, 7.7; N, 4.9.

EXAMPLE 2

The process of Example 1 was repeated but using the methyl ester of 18β-glycyrrhetinic acid as starting material. There was thus obtained methyl 2,2-dinitro-3,11-dioxo-18β-olean-12-en-30-oate (I) (R=CH₃) which, after recrystallisation from methanol-chloroform, had a melting point of 205–206° C. (decomp.): $[\alpha]_D = 158 \pm 1°$ (C.=1% in chloroform).

Analysis.—$C_{31}H_{44}N_2O_8$ (M.W. 572) calc. (percent): C, 65.0; H, 7.7; N, 4.9. Found (percent): C, 65.0; H, 7.7; N, 5.15.

EXAMPLE 3

30 g. 2,2 - dinitro - 3,11 - dioxo-18β-olean-12-en-30-oic acid (obtained in the manner described in Example 1) were mixed with 400 ml. methanol and 100 ml. 10% aqueous sodium carbonate solution. The dinitro compound dissolved slowly in about 10 hours. The clear yellow solution obtained was acidified with hydrochloric acid and the precipitated product was filtered off, washed with aqueous methanol and recrystallised twice from aqueous methanol to give 15 g. methyl 2,2-dinitro-2,3-seco - 11 - oxo - 18β-olean-12-en-3-oate-30-oic acid (II) (R=H; R'=CH₃) with a melting point of 236–237° C. (decomp.); $[\alpha]_D = +101 \pm 2°$ (C.=0.5% in chloroform).

Analysis.—$C_{31}H_{46}N_2O_9$ (M.W. 590) calc. (percent): C, 63.0; H, 7.85; N, 4.75. Found (percent): C, 63.2; H, 7.7; N, 5.3.

EXAMPLE 4

67 g. 2,2 - dinitro - 3,11 - dioxo-18β-olean-12-en-30-oic acid (obtained in the manner described in Example 1) were dissolved in 270 cc. boiling 5% aqueous sodium hydroxide solution. After 3 hours, the solution was cooled and acidified with hydrochloric acid and the precipitated product filtered off and washed with water. After recrystallisation from aqueous acetone, there were obtained 35 g. 2,2 - dinitro - 2,3-seco-11-oxo-18β-olean-12-en-3,30-dioic acid (II) (R=R'=H) with a melting point of 244–245° C. (decomp.); $[\alpha]_D = +101 \pm 2°$ (C.=1% in methanol); $[\alpha]_D = +97 \pm 2°$ (C.=1% in acetone).

A further 11 g. of this dioic acid were obtained by adding water to the mother liquor, filtering off the precipitated product and recrystallising it twice from acetone-petroleum ether.

Analysis.—$C_{30}H_{44}N_2O_9$ (M.W. 576) calc. (percent): C, 62.5; H, 7.7; N, 4.9. Found (percent): C, 62.4; H, 7.8; N, 5.3.

EXAMPLE 5

2,2 - dinitro-2,3-seco-11-oxo-18β-olean-12-en-3,30-dioic acid (obtained in the manner described in Example 4) was reacted in ethereal solution with diazo methane. There was obtained dimethyl 2,2-dinitro-2,3-seco-11-oxo-18β-olean-12-en-3,30 dioate (11) (R=R'=CH₃) which, after recrystallisation from acetone-petroleum ether, had a melting point of 194–195° C. (decomp.); $[\alpha]_D = +101 \pm 1°$ (C.=1% in chloroform).

Analysis.—$C_{32}H_{48}N_2O_9$ (M.W. 604) calc. (percent): C, 63.5; H, 8.0; N, 4.6. Found (percent): C, 63.6; H, 8.0; N, 4.9.

The present invention also includes within its scope pharmaceutical compositions containing one or more of the new compounds. These pharmaceutical compositions can be administered orally or parenterally in admixture with a solid or liquid pharmaceutical carrier.

Solid compositions for oral administration include compressed tablets, pills, dispersible powders and granules. In such solid compositions, at least one active compound according to the present invention is admixed with at least one inert diluent, such as calcium carbonate, starch, alginic acid or lactose. The compositions may also comprise, as is normal practice, additional substances other than inert diluents, for example, lubricating agents, such as magnesium stearate.

Liquid compositions for oral administration include pharmaceutically acceptable emulsions, solutions, suspensions, syrups and elixirs containing inert diluents commonly used in the art, such as water and liquid paraffin. Besides inert diluents, such compositions may also comprise adjuvants, such as wetting and suspension agents and sweetening and flavouring agents.

The compositions according to the present invention, for oral administration, include capsules of absorbable material, such as gelatine, containing at least one of the active substances according to the present invention, with or without the addition of diluents or excipients.

Preparations according to the present invention for parenteral administration include sterile aqueous or non-aqueous solutions, suspensions or emulsions; examples of non-aqueous solvents or suspending media include propylene glycol, polyethylene glycol, vegetable oils, such as olive oil, and injectable organic esters, such as ethyl oleate. These compositions may also contain adjuvants, such as wetting, emulsifying and dispersing agents. They may be sterilised, for example, by filtration through bacteria-retaining filters, by incorporation into the compositions of sterilising agents, by irradiation or by heating. They may also be produced in the form of sterile solid compositions, which can be dissolved in sterile water or some other sterile injectable medium immediately before use.

The percentage of active ingredient in the compositions of the invention may be varied, it being necessary that it should constitute a proportion such that a suitable dosage for the desired therapeutic effect shall be obtained. In general, the preparations of the present invention should be administered in an effective dose from about 10 to about 750 mg. of active substance per day. Topical application may be effected with the aid of an ointment of per se conventional base composition (e.g. petrolatum) containing an anti-inflammatorily effective amount of active substance and applied topically as required.

I claim:

1. A compound of the general formula:

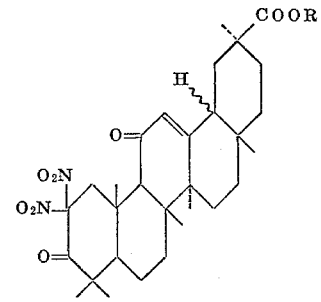

(I)

or

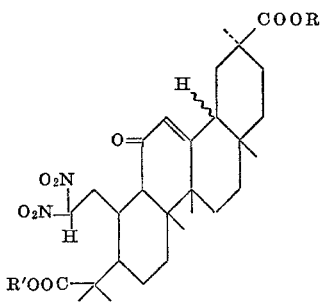

(II)

wherein R and R', which may be the same or different, are hydrogen atoms or alkyl, alkenyl or alkynyl radicals, containing up to 6 carbon atoms which may be substituted by chlorine or bromine.

2. A compound according to claim 1 which is 2,2-dinitro-3,11-dioxo-18β-olean-12-en-30-oic acid.

3. A compound according to claim 1 which is methyl 2,2-dinitro-3,11-dioxo-18β-olean-12-en-30-oate.

4. A compound according to claim 1 which is methyl 2,2 - dinitro - 2,3 - seco - 11 - oxo - 18β - olean - 12 - en - 3-oate-30-oic acid.

5. A compound according to claim 1 which is 2,2-dinitro - 2,3 - seco - 11 - oxo - 18β - olean - 12 - en - 3,30 - dioic acid.

6. A compound according to claim 1 which is dimethyl 2,2 - dinitro - 2,3 - seco - 11 - oxo - 18β - olean - 12 - en - 3,30-dioate.

References Cited

FOREIGN PATENTS 1,340,000  6/1961  France.

LORRAINE A. WEINBERGER, Primary Examiner

P. J. KILLOS, Assistant Examiner

U.S. Cl. X.R.

260—514; 424—305, 317